Patented Sept. 15, 1953

2,652,411

UNITED STATES PATENT OFFICE 2,652,411

ALKYL ACYLOXY STEARATES

Howard M. Teeter and John C. Cowan, Peoria, Ill., assignors to the United States of America as represented by the Secretary of Agriculture No Drawing. Application July 18, 1952, Serial No. 299,770

7 Claims. (Cl. 260—405)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a series of novel chemical compounds which have particular value as lubricants. The invention relates more particularly to the class of alkyl acyloxy stearates in which the alkyl group is a branched chain and in which the acyloxy group is situated at a carbon atom in the midportion of the stearyl chain.

The compounds of this invention have the following structural formula:

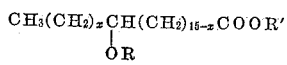

In the formula $x$ is an integer from 4 to 10 inclusive, R is an aliphatic acyl group such as acetyl, propionyl, diethylacetyl, butyryl, and the like, and R' is a branched chain saturated aliphatic group such as ethylhexyl, isopropyl, methylpentyl, and the like. The new compounds have particular utility as lubricants and possess advantages over prior esters of ricinoleic acid inasmuch as they are considerably more stable to oxidation and gum formation and are, moreover, less prone to form acidic decomposition products. Those esters of our novel class in which the R' group contains more than five carbon atoms, such as ethylhexyl, possess particular advantageous properties for use as low temperature lubricants.

The alkyl acyloxy stearates of this invention are compatible with appropriate lubricant additives, and improvers such as pour point depressants, viscosity index improvers, gum inhibitors, anti-oxidants, oiliness improvers, and the like.

The esters are prepared by a two step process of, first, forming an ester of hydroxystearic acid with a branched chain aliphatic alkanol, and subsequently esterifying the hydroxyl group with an aliphatic acyl compound. Each separate step may be effected according to known methods. We have found, however, that the steps must be in this sequence in order to accomplish satisfactory synthesis. The acyl compound may be the acid anhydride or halide, or mixtures thereof.

In the folowing specific examples, the product of the first esterification step was purified by distillation fractionation. For many purposes, however, a satisfactory lubricant composition may be prepared by utilizing the crude product of the first step directly in the second step and then purifying the product as desired by distillation fractionation.

The hydroxystearic acid starting material may be prepared by known methods. For example, the mixture of 9- and 10-hydroxystearic acids used in Examples 1 to 4 may be prepared via sulfation of oleic acid and subsequent hydrolysis in known manner. The 12-hydroxystearic acid in which $x$ equals 5, employed in Examples 5 to 10, may be prepared by hydrogenating ricinoleic acid.

EXAMPLE 1

2-ethylhexyl hydroxystearate

A mixture of 400 g. (1.33 moles) hydroxystearic acid (N. E.–2.99, I. V.–1.8), 520 g. (4 moles) of 2 ethylhexanol, 0.5 g. of conc. sulfuric acid and 1 liter of benzene was placed in a 5 liter flask fitted with a condenser and Bidwell-Sterling moisture trap. The material was refluxed for a period of 8 hours during which the theoretical amount of water (24 ml.) was collected in the moisture trap. The product was transferred to a separatory funnel and washed with distilled water until the washings were free of mineral acid. The product layer was placed in a distillation apparatus and the benzene removed by distillation at 30–40 mm. The excess alcohol was removed at a pressure of 1 mm. or less. The crude product was obtained in theoretical yield (550 g.). This material was passed through a falling film molecular still at a pressure of 7–12 microns; the ester distilling between 135–155° C. under these conditions was taken as the main fraction. Acid number of the main fraction was 1.0; yield, 350 g. (63 percent).

EXAMPLE 2

2-ethylhexyl propionoxystearate

One mole of 2-ethylhexyl hydroxystearate, the product of Example 1, and 7–8 moles of propionic anhydride containing 0.25 mole of propionyl chloride were placed in a round bottomed flask fitted with a condenser and heated for 3 hours on a steam bath. The product was transferred to a distillation apparatus and the excess acylating reagent removed by distillation under reduced pressure. The resulting ethylhexyl propionoxystearate was washed with water, then with 10 percent sodium bicarbonate, and finally with more distilled water. After drying under reduced pressure the product weighed 388 g. (86.4 percent). This material was distilled in a falling film molecular still at 7-12 microns. The main fraction distilled at 145-155° C.; yield 348 g. (77.4 percent). The acid number was reduced to 0.08 by diluting with 1 liter of petroleum ether (B. P.—<60° C.) and passing through a column 8 x 32 cm. packed with alumina.

In like manner, other alkyl acyloxy stearates were prepared by substituting the appropriate branched chain alkanol in the procedure of Example 1 to obtain the corresponding branched chain alkyl hydroxystearate, and then substituting the appropriate acyl anhydride for the proprionyl compound in the procedure of Example 2. The physical properties of the compounds are summarized in Table 1.

The anhydride type acylating mixture employed in the examples may be supplanted by the corresponding acyl halide, as for example, acetyl chloride, butyryl chloride, or diethyl acetyl chloride, and the like. In a similar manner, mixtures of the acyl anhydride and the acyl halide may be used. The physical properties of the products, as summarized in Table I, include the viscosity index, A. S. T. M. slope, and the pour point. These particular characteristics have been included to illustrate the lubricating utility of the compounds. The pour point data illustrates the particular utility of the compounds as low temperature lubricants in which R' contains six or more carbon atoms.

TABLE I

Properties of alkyl acyloxy stearates

| Example No. | R | R' | X | $N_D^{30}$ | $d_{30}$ | Sap. Equiv. Found | Sap. Equiv. Calc. | Carbon, Percent Found | Carbon, Percent Calc. | Hydrogen, Percent Found | Hydrogen, Percent Calc. | Mol. Refr. Found | Mol. Refr. Calc. | Visc. Index | ASTM Slope | Pour Point, °F. |
|---|---|---|---|---|---|---|---|---|---|---|---|---|---|---|---|---|
| 2 | Propionyl | 2-Ethylhexyl | 7(8) | 1.4469 | 0.9005 | 232 | 234 | 74.15 | 74.4 | 11.92 | 11.96 | 138.8 | 139.5 | 142.0 | 0.723 | −47 |
| 3 | Acetyl | do | 7(8) | 1.4471 | 0.8985 | 230 | 227 | 74.3 | 74.0 | 12.00 | 11.90 | 135.0 | 134.0 | 134.6 | 0.722 | −44 |
| 4 | Diethylacetyl | do | 7(8) | 1.4480 | 0.8922 | 390 | 255 | 74.9 | 75.0 | 12.14 | 11.94 | 153.0 | 153.4 | 145.9 | 0.706 | −51 |
| 5 | Acetyl | do | 5 | 1.4473 | 0.8984 | | | 73.9 | 74.1 | 11.68 | 11.56 | 134.6 | 132.7 | 145.5 | 0.699 | −63 |
| 6 | Propionyl | do | 5 | 1.4470 | 0.8965 | | | 74.2 | 74.3 | 11.64 | 12.05 | 139.6 | 139.5 | 152.3 | 0.700 | −62 |
| 7 | Butyryl | do | 5 | 1.4481 | 0.8946 | | | 74.7 | 74.6 | 11.92 | 12.12 | 144.4 | 144.1 | 155.3 | 0.683 | −53 |
| 8 | Diethylacetyl | do | 5 | 1.4491 | 0.8917 | | | 75.5 | 75.2 | 12.28 | 12.16 | 153.6 | 153.3 | 145.2 | 0.682 | −22 |
| 9 | Propionyl | Isopropyl | 5 | 1.4410 | 0.9013 | | | 72.3 | 72.3 | 11.33 | 11.64 | 116.7 | 116.3 | 130.2 | 0.726 | +7 |
| 10 | do | 2-Methylpentyl | 5 | 1.4502 | 0.8815 | | | 75.9 | 73.6 | 12.75 | 11.90 | 134.5 | 130.2 | 103.6 | 0.751 | −29 |

We claim:
1. Alkyl acyloxy stearates of the following structural formula:

$$CH_3(CH_2)_x\underset{\underset{R}{|}}{C}H(CH_2)_{15-x}COOR'$$

in which $x$ is an integer from 4 to 10, R is an aliphatic acyl radical, and R' is a branched chain saturated aliphatic radical.
2. 2-ethylhexyl propionoxystearate.
3. 2-ethylhexyl acetoxystearate.
4. 2-ethylhexyl butyroxystearate.
5. 2-ethylhexyl diethylacetoxystearate.
6. 2-methylpentyl propionoxystearate.
7. Compound of claim 1 in which R' contains more than 5 carbon atoms.

HOWARD M. TEETER.
JOHN C. COWAN.

No references cited.